US009646318B2

(12) United States Patent
McGavran et al.

(10) Patent No.: US 9,646,318 B2
(45) Date of Patent: May 9, 2017

(54) UPDATING POINT OF INTEREST DATA USING GEOREFERENCED TRANSACTION DATA

(71) Applicant: Apple Inc., Cupertino, CA (US)

(72) Inventors: Christine B. McGavran, Pacifica, CA (US); François M. Jouaux, Woodside, CA (US); David Luper, Cupertino, CA (US); Christophe Hivert, Cupertino, CA (US); Rama Krishna Chitta, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,074

(22) Filed: Sep. 30, 2014

(65) Prior Publication Data

US 2015/0345969 A1 Dec. 3, 2015

Related U.S. Application Data

(60) Provisional application No. 62/006,021, filed on May 30, 2014.

(51) Int. Cl.
*G01C 21/34* (2006.01)
*G06Q 30/02* (2012.01)
*G06F 17/30* (2006.01)
*G01C 21/32* (2006.01)

(52) U.S. Cl.
CPC ........ *G06Q 30/0205* (2013.01); *G01C 21/32* (2013.01); *G06F 17/30598* (2013.01)

(58) Field of Classification Search
CPC ............... G01C 21/32; G06Q 30/0205; G06F 17/30598
See application file for complete search history.

(56) References Cited

U.S. PATENT DOCUMENTS

| 8,417,572 B1* | 4/2013 | Chenault | G06Q 10/087 235/385 |
| 2009/0005987 A1* | 1/2009 | Vengroff | G06Q 30/02 701/300 |
| 2012/0108259 A1* | 5/2012 | Weiss | G06Q 30/0261 455/456.1 |
| 2013/0124263 A1* | 5/2013 | Amaro | G06Q 30/02 705/7.34 |

* cited by examiner

*Primary Examiner* — Yuen Wong
(74) *Attorney, Agent, or Firm* — Fish & Richardson P.C.

(57) ABSTRACT

Georeferenced transaction data is harvested ("crowd-sourced") from client devices and sent to a network-based map service. The map service performs cluster analysis on location data points in the harvested data, resulting in one or more clusters representing local densities of transaction occurrences. Data vectors including supplemental data are obtained from one or more vendors. Location data points included in the data vectors are compared to center coordinates of the one or more clusters and the closest matching cluster/vector pair provides a mapping to POI data in a POI database. The mapped POI data is updated with the supplemental data. In some implementations, transaction timestamps in the harvested data are used to estimate the business hours of a business POI.

22 Claims, 8 Drawing Sheets

| Transaction Description | Latitude | Longitude | Location Timestamp | Transaction Timestamp |
|---|---|---|---|---|
| ACM #2358 | 37.53° | -122.24° | 13:00 | 13:15 |
| ACM #2358 | 37.51° | -122.25° | 13:15 | 14:00 |
| ACM #2358 | 37.54° | -122.1° | 13:30 | 13:45 |
| ⋮ | | | | |

FIG. 4

| POI ID | Latitude | Longitude | L1 Data | L2 Data |
|---|---|---|---|---|
| 33431 | 37.53° | -122.24° | ACM #2358 | Acme Inc.<br>123 Main St<br>Redwood City CA 94064 |
| 34342 | 37.32° | -121.86° | KPSJ #1358 | KP Services Inc.<br>324 Park Ave<br>San Jose CA 95125 |
| 54232 | 37.37° | -121.93° | SJF #2358 | San Jose Florist<br>3421 Jefferson Ave<br>San Jose CA 95123 |
| ⋮ | | | | |

FIG. 5

UPDATING POINT OF INTEREST DATA USING GEOREFERENCED TRANSACTION DATA

CROSS-REFERENCE TO RELATED APPLICATION

This application claims priority to U.S. Provisional Patent Application No. 62/006,021, entitled "Updating Point of Interest Data Using Georeferenced Transaction Data," filed May 30, 2014, the entire contents of which are incorporated herein by reference.

TECHNICAL FIELD

This disclosure relates generally to web-based mapping service technology.

BACKGROUND

Web-based mapping services provide satellite imagery, street maps, and street view perspectives to vehicle navigation systems and location-aware client devices (e.g., smart phones, computer tablets, wearable computers), including providing services such as route planning and turn-by-turn directions. Web-based mapping services maintain a map database of map data representing road networks and associated features such as points of interest. A point of interest (POI) is a specific point location that someone may find useful or interesting, including but not limited to historical landmarks, parks, museums, hospitals, schools and businesses. POIs in map datum typically include latitude and longitude of the POI. A name or description for the POI may also be included in the map datum. Navigation applications typically use icons to represent different categories of POIs on a map graphically.

Commercial POI collections can be purchased by map service providers on a subscription basis or obtained from a royalty-free collection. Such POI collections may be inaccurate and/or incomplete. Map service providers may have to rely on third-party vendors to update their POI collections to correct for errors or to identify new POIs, thus preventing map service providers from controlling the quantity and quality of the POI data served to client devices.

SUMMARY

Georeferenced transaction data is harvested ("crowd-sourced") from client devices and sent to a network-based map service. The map service performs cluster analysis on location data points in the harvested data, resulting in one or more clusters representing local densities of transaction occurrences. Data vectors including supplemental data are obtained from one or more vendors. Location data points included in the data vectors are compared to center coordinates of the one or more clusters and the closest matching cluster/vector pair provides a mapping to POI data in a POI database. The mapped POI data is updated with the supplemental data. In some implementations, transaction timestamps in the harvested data are used to estimate the business hours of a business POI. In some implementations, a process is disclosed for describing a cluster of data with a limited set of parameters.

In some implementations, a method comprises: receiving, at a network-based service, georeferenced transaction data harvested from wireless devices during transaction events; performing cluster analysis on the georeferenced transaction data, the cluster analysis resulting in one or more clusters associated with the georeferenced transaction data; mapping supplemental data to one of the one or more clusters; and updating point of interest (POI) data with the supplemental data.

In some implementations, a method comprises: determining, by a wireless device, a location of the wireless device operating in a vicinity of a business; performing a wireless financial transaction with the business; receiving a non-unique transaction description; determining a time of the transaction; sending a data log to a network-based service, the data log including the location of the wireless device, the transaction data and the time of the transaction; receiving point of interest (POI) data associated with the business, where the POI data includes supplemental data associated with the business, where the supplemental data is obtained by the network-based service independent of the financial transaction with the business; replacing the non-unique transaction description with the supplemental data; and displaying the supplemental data on the device.

Other implementations are directed to systems, devices and non-transitory, computer-readable storage mediums. Particular implementations disclosed herein provide one or more of the following advantages. A customer using a client device to perform a transaction at a business POI is provided with non-cryptic business information (e.g., business name, street address) rather than receiving a cryptic transaction description, such as is typically provided on a credit card receipt.

The details of the disclosed implementations are set forth in the accompanying drawings and the description below. Other features, objects and advantages are apparent from the description, drawings and claims.

DESCRIPTION OF DRAWINGS

FIG. 4 is an example data structure for storing harvested data.

FIG. 5 is an example data structure for storing POI data.

The same reference symbol used in various drawings indicates like elements.

DETAILED DESCRIPTION

Example System

Figure 1:
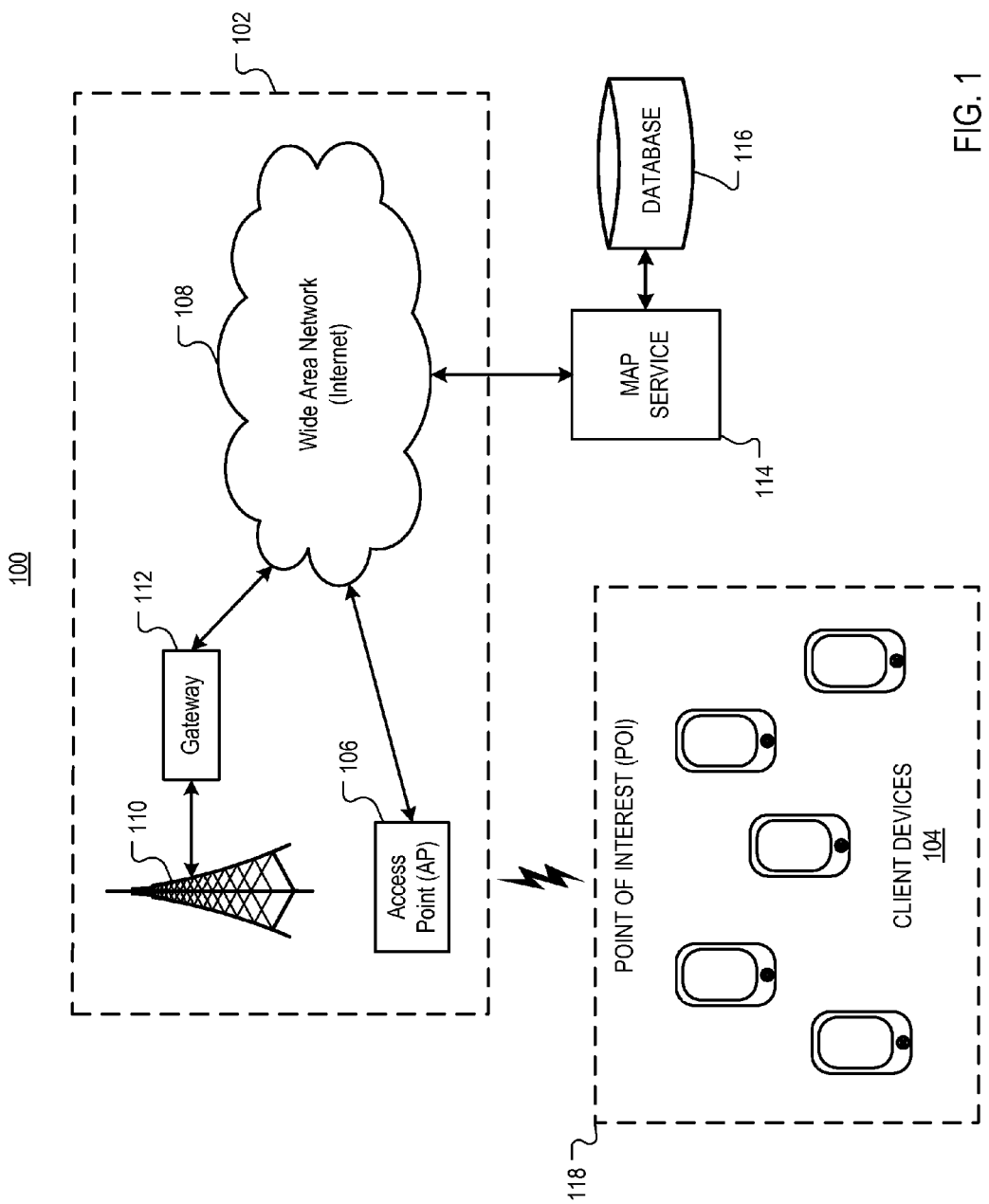
FIG. 1 illustrates an example system for updating POI data using georeferenced transaction data.

FIG. 1 illustrates an example system 100 for updating POI data using georeferenced transaction data. In some implementations, system 100 can include wireless network 102, client devices 104, map service 114 and database 116. Wireless network 102 further includes access point 106, cell tower 110, gateway 112 and wide area network 108 (e.g., the Internet). System 100 is a conceptual diagram useful for describing the disclosed implementations. In practice, system 100 can include any number of access points, cell towers, gateways, map services, databases and client devices.

Client devices 104 can be any wireless communication device, including but not limited to smart phones, tablet computers and wearable computers. Map service 114 can include one or more server computers and other infrastructure for communicating with client devices 104 over wide area network 108. Map service 114 can access database 116 to read and write map data to support map services provided to client devices 104. For example, database 116 can include a road network model that represents features (e.g., nodes, links and areas) and properties (e.g., location coordinates, shape, addresses, road class and speed range) of road networks. Database 116 can also store other data associated with the road network, including but not limited to POIs. The road network model and POI data can be used by map service 114 to provide various map services to applications running on client devices 104, including but not limited to navigation, friend tracking and other location-based applications.

Harvesting Mobile Payment Transaction Data

In addition to providing map services to client devices 104, map service 114 receives harvested or "crowd-sourced" anonymous transaction data from client devices 104 for use in updating POI data stored in database 116. The transaction data can be harvested by client devices operating in the vicinity of POI 118, which can be associated with a business (hereinafter referred to as "business POI"). For example, POI 118 can be a retail store where users of client devices 104 can perform wireless financial transactions using wireless technology (e.g., Near Field Communication (NFC) technology), such as mobile payments.

In an example use scenario, a user can scan a barcode (e.g. QR code) displayed on their smart phone with a barcode reader at a check-out counter. Such wireless financial transactions are often documented with an electronic receipt sent to the client device that includes a non-unique cryptic transaction description. The cryptic transaction description often does not provide a complete business name and/or street address. For example, a fictitious retail chain Acme Inc. may provide an electronic receipt with the cryptic transaction description "ACM #2358." Such cryptic transaction descriptions are not meaningful to users. In the discussion that follows, cryptic transaction descriptions collected at a point of sale will be referred to as Level One data or simply "L1" data.

At the point of sale, and assuming the user has "opted in", anonymous L1 data logs can be created by a daemon running on the device and sent to map service 114 in a manner that is transparent to the user. In some implementations, the L1 data logs include a non-unique cryptic transaction description, a location data point (e.g., latitude, longitude) and corresponding location and transaction timestamps. At map service 114, a search engine maps the non-unique L1 cryptic transaction description to a unique POI identifier (ID) (L1→POI_ID) using for example a look-up table. The POI ID is used by the search engine to index a POI database to retrieve POI data, as described in reference to FIG. 2. The POI data includes information about the business POI including but not limited to: business name, street address, telephone number, customer ratings (e.g., Yelp® ratings), content (e.g., digital photos, video), Web address and any other information associated with the business POI that may be of interest to a user. The POI data can be aggregated and conflated by map service 114 from a number of data sources.

Figure 2:
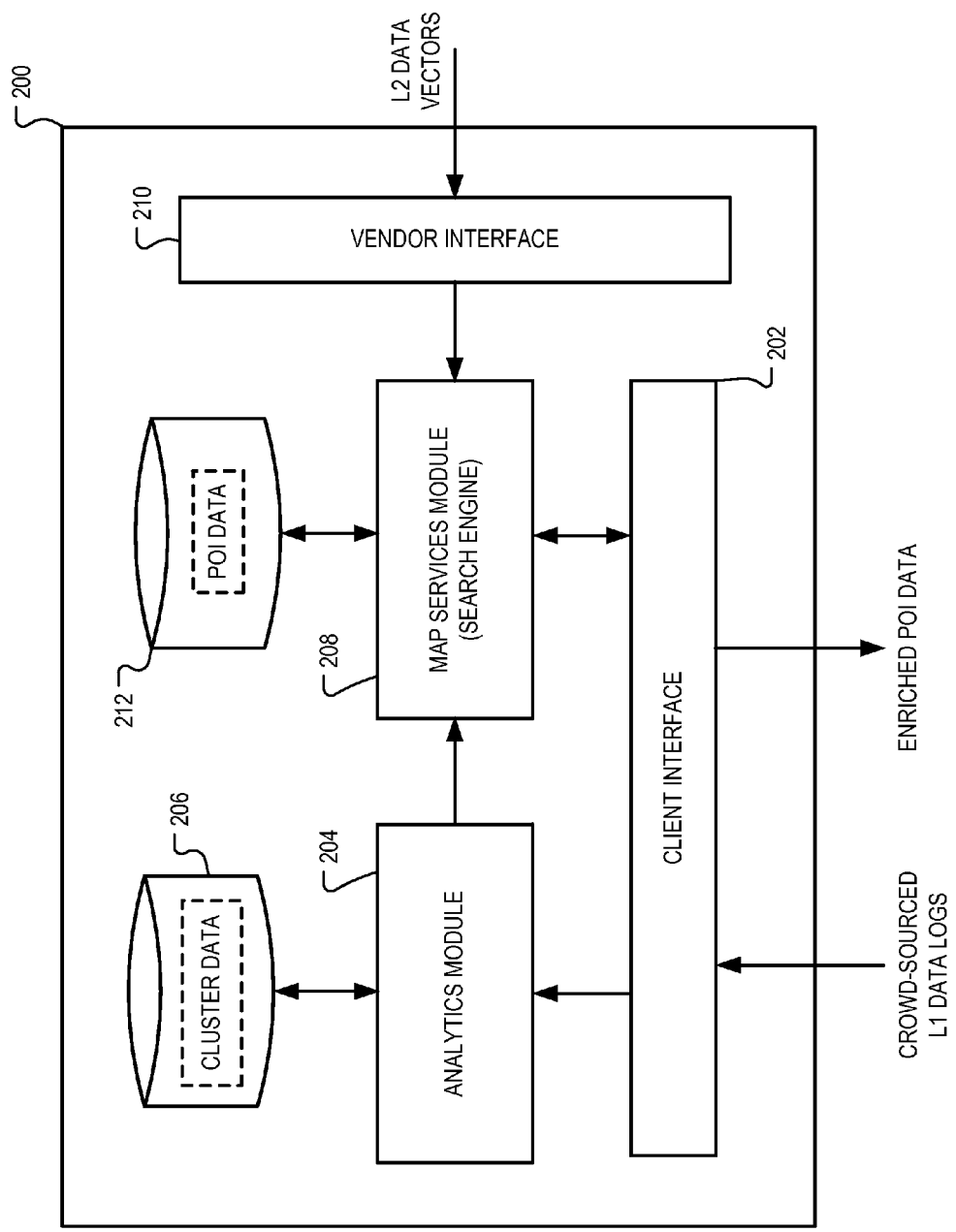
FIG. 2 is a conceptual block diagram of the map service of FIG. 1 for updating POI data using georeferenced transaction data.

FIG. 2 is a conceptual block diagram of system 200 implemented by map service 114 of FIG. 1 for updating POI data using georeferenced transaction data. In some implementations, system 200 can include client interface 202, analytics module 204, analytics database 206, map services module 208, POI database 212 and business interface 210. The components of system 200 can be implemented in hardware, software or a combination of hardware and software. The implementation of the components can be distributed among multiple server computers that may or may not be co-located in the same facility or owned or operated by the same entity.

Harvested L1 data logs can be sent to system 200 on a scheduled basis or in response to a trigger event. An example trigger event could be a transaction event (e.g., a mobile payment event) at a business location. Each L1 data log can include a location data point (latitude, longitude), which can be determined by a global navigation satellite system (GNSS) receiver embedded in or coupled to the client device, such as a Global Position System (GPS) receiver. The location data point can also be determined by trilateration of radio frequency (RF) signals from cell towers or beacons (e.g., WiFi or Bluetooth beacons).

The harvested L1 data logs are received through client interface 202 and processed by analytics module 204. In some implementations, analytics module 204 performs a cluster analysis on the L1 location data points included in a set of L1 data logs that include a common cryptic transaction description. An example cluster analysis algorithm is the "k-means algorithm." The k-means algorithm calculates the centers (latitude, longitude) of k clusters of L1 location data points, and assigns each L1 location data point to a nearest cluster center in an iterative manner such that the squared distances of the L1 location data points from a nearest cluster center are minimized. The result of the k-means algorithm is a set of k clusters of L1 location data points that have a common L1 cryptic transaction description. The center coordinates of each cluster are represented by a single L1 location data point (e.g., mean latitude, mean longitude). The cluster center coordinates can be stored in analytics database 206 for further processing by map services module 208.

Vendor interface 210 receives supplemental data from vendors. A vendor can be, for example, a business or a broker. The supplemental data can include but is not limited to business name and street address. In the description that follows, supplemental data is also referred to as Level 2 or "L2" data. In addition to business name and street address, each L2 data (hereinafter referred to as "L2 data vector") includes a cryptic transaction description and optionally geographic coordinates (latitude, longitude) for the street address. L2 data vectors can be provided electronically to vendor interface 210, for example, by a data feed or delivered on a computer-readable medium. In the latter case, vendor interface 210 represents a conceptual function rather than an electronic interface.

In some instances there may be multiple L2 data vectors that map to a single L1 data log due to the non-uniqueness of the shared cryptic transaction data. For example, a single, non-unique cryptic transaction description may be included in multiple L2 data vectors. This may occur, for example, if the business is a chain with multiple stores located within close proximity of each other, creating a "one-to-many" mapping between L1 data clusters and L2 data vectors. To reduce the "one-to-many" mapping (L1→L2$_i$, for i=1 to N, where N>1) to a one-to-one mapping (L1→L2), map services module 208 reads the cluster data stored in analytics database 206 and compares the cluster center coordinates of each of the "k" clusters to the location data point in each of the L2 data vectors. If the L2 data does not include location coordinates, the business street address included in the L2 vector can be geocoded into latitude and longitude using, for example, a geographic information system (GIS). The L2$_i$ location data point that most closely matches the center coordinates of a cluster j, for j=1 . . . k, where j<=k, is associated to cluster j, and thus a single L2 vector will be associated to a single L1 data log. The association can be stored in a look-up table in POI database 212. After a single L2 data vector is mapped to a single L1 data log, the supplemental data in the L2 data vector (e.g., business name, address) can be added to the POI data stored in POI database 212 using the L1→POI_ID mapping previously described.

In some implementations, in the absence of L2 data, fuzzy matching can be used to match L1 to an existing set of POIs (L1 to POI "name") with a defined radius around the location of the transaction.

When at a different time another client device 104 performs a transaction event, the L1 cryptic transaction description is sent to map service 114, where system 200 uses the L1→POI_ID mapping and, in some cases, a reasonably accurate location estimate for the POI to map the cryptic transaction description to a POI_ID in POI database 212. To map the cryptic transaction description to a POI, it is usually the case that both the L1 cryptic transaction description (e.g., which includes a cryptic name of the business) and reasonably accurate location data for the POI are needed to perform the L1→PO ID mapping because the cryptic transaction description may not be unique, preventing lookup of POI data in the POI database without additional location context. In many cases, the street address included in the L2 data vector is inaccurate, so the POI data cannot be retrieved from the POI database without the benefit of harvested, georeferenced data to improve the location accuracy of the POI.

The POI data indexed by the POI_ID is updated with the supplemental data provided by the associated L2 data vector. System 200 provides the L2-enriched POI data to client device 104, where it can be displayed in a user interface of an application running on client device 104 (e.g., mobile payment application). The improved accuracy and/or completeness of the L2-enriched POI data can then be used by other applications running on client device 104 that may benefit from complete and accurate POI data (e.g., navigation/map application).

Example Process

Figure 3:
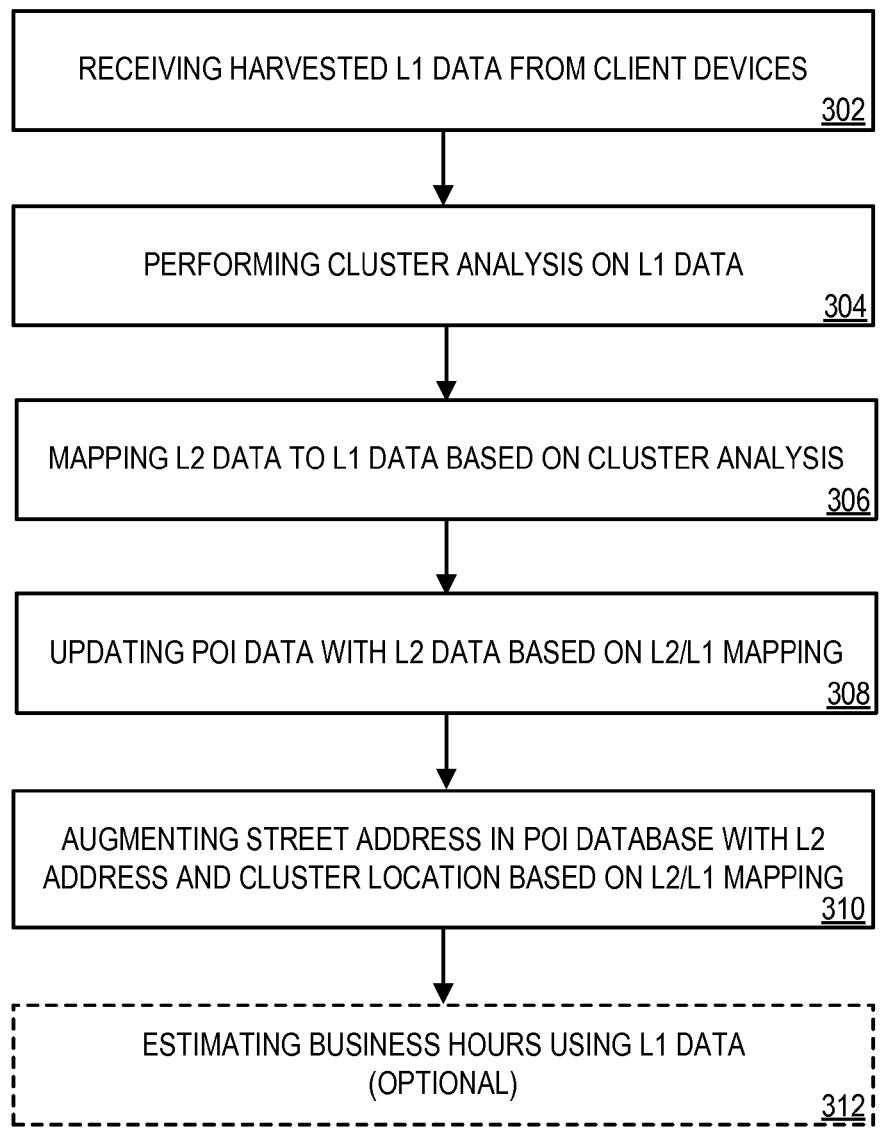
FIG. 3 is a flow diagram of example process of updating POI data using georeferenced transaction data.

FIG. 3 is a flow diagram of example process 300 of updating POI data using georeferenced transaction data. Process 300 can be implemented by one or more server computers, which can have the example architecture 800 as described in reference to FIG. 8.

In some implementations, process 300 can begin by receiving, at a server computer, harvested L1 data from a plurality of client devices (302). In some implementations, the harvested L1 data can include cryptic transaction descriptions and corresponding transaction timestamps. The harvested L1 data may also include a location of the client device and a corresponding location timestamp.

Process 300 can continue by performing cluster analysis on location data points included in the harvested L1 data (304). For example, an analytic module implemented on the server computer can perform a cluster analysis on the location data points using the k-means clustering algorithm, as described in reference to FIG. 2. The result of the cluster analysis includes clusters of location data points each having center coordinates represented by a latitude and longitude.

Process 300 can continue by mapping one of many L2 data vectors to one of the L1 data clusters, resulting in any one-to-one relationship between L1 and L2 data (306). For example, location data points included in the L2 data vectors can be compared to the center coordinates of each cluster and the closest matching cluster can be selected for mapping to a POI database based on the comparison.

If the L1 data (e.g., the cryptic transaction description) is mapped to POI data in a POI database (e.g., mapped to a POI_ID), then the POI data is updated with the supplemental data contained in the selected L2 data vector (308). If the L1 data is not mapped to POI data in the POI database, then a new business POI can be added to the POI database and a new L1 to POI_ID mapping is created in the L1 to POI_ID table.

In some implementations, the street address included in the POI data can be augmented with an L2 street address (if available) and cluster center coordinates based on the L2/L1 mapping (310).

Figure 6:
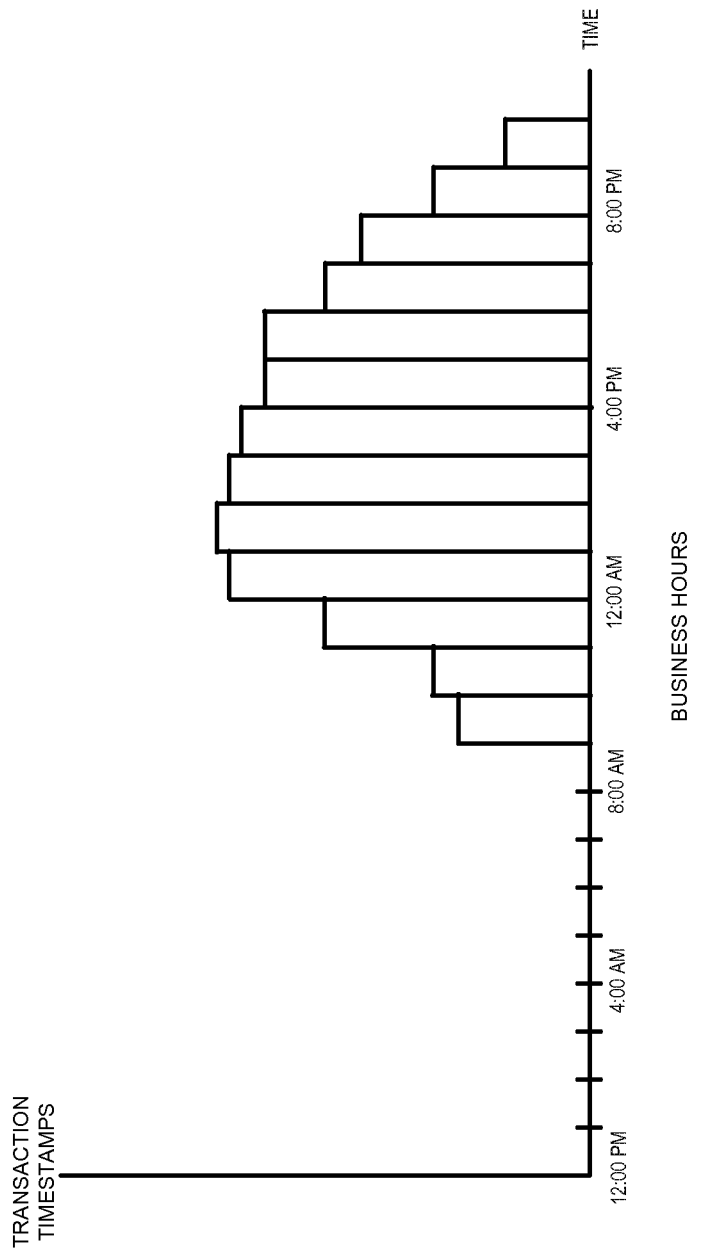
FIG. 6 is an example histogram illustrating the use of harvested transaction timestamps to determine business hours of business POIs.

In some implementations, the transaction timestamps in the L1 data logs are used to estimate the business hours for the business (312). For example, the server computer can perform a histogram analysis on the timestamps to determine a distribution of transactions timestamps over a desired time period (e.g., a 24-hour time period), as shown in FIG. 6.

As a result of process 300, client devices performing transactions at the POI can now receive accurate and complete information for the transaction including an accurate and complete business name and street address and any other information included in the supplemental data.

In practice, an L2 data vector may not include a location data point. In such a case, clustering analysis may not be helpful. In some implementations, if no location data points are included in an L2 data vector, then the cryptic transaction descriptions in the L2 data vectors can be compared directly to the cryptic transaction descriptions included in the POI data in the POI database by string matching. If a one-to-one string match can be found then the matched POI data can be updated with the supplemental data included in the matched L2 data vector. Otherwise, the POI data is not updated due to a high probability of error in the L2 to L1 data mapping.

If there are multiple cryptic transaction descriptions for a business and the string matching results in some but not all of the cryptic transaction descriptions being resolved to POI data, then the unresolved cryptic transaction descriptions can be resolved to the POI data by first comparing the unresolved cryptic transaction descriptions with previously resolved cryptic transaction descriptions.

FIG. 4 is an example data structure for storing harvested L1 data logs. In the example shown, a database table can be used to store L1 data logs in a database maintained by service 114. Each row of the database table can correspond to a single L1 data log provided by a single client device. Note that no personal information is stored in the database table. The first column includes a cryptic transaction description, the second and third columns can include latitude and longitude of the current location of the client device, the fourth column includes a timestamp indicating when the location of the device was determined and the fifth column includes a timestamp indicating the time of the transaction. Other implementations of the database table can include more or fewer columns or rows in the table. For example, in addition to latitude and longitude, harvested location data can include location accuracy data (e.g., error radius) and/or RF signature data. The RF signature data can be used to correct indoor location mappings.

In some implementations, the location and transaction timestamps can be "blurred" using 15 minute time windows for privacy reasons before the timestamps are sent to service 114. For example, timestamps in the time window of 13:01-13:04 can be clamped to 13:00 and timestamps in the time window 13:05-13:14 can be clamped to 13:15, therefore "blurring" the true timestamps of the location and transaction. Also, timestamps can be stored in a separate table from the location data. Using these techniques, if the system knows what time a user made a purchase, that purchase cannot be mapped to the location of that purchase. In some implementations, short-term logs are used to store individual transactions and long-term logs are used to store aggregated transactions with a minimum density of individual transaction data to aggregate.

In some implementations, in addition to updating a business name in the POI database, other databases can be updated as desired, including but not limited to street address information in a map database. For example, the latitude and longitude of the street address "123 Main St" of a business POI can be corrected regardless of or in addition to correcting the business name of the POI.

In the example shown, the first row of the database table includes a cryptic transaction description "ACM #2358." The transaction occurred at the location data point 37.53° (latitude) and −122.24° (longitude) (Redwood City Calif.) at time 13:12 (military time), where the location data was determined at time 13:04. For privacy reasons, these timestamps were stored as 13:15 and 13:00, respectively, using the 15 minute blurring time window previously described. Note that "ACM #2358" can be mapped to a POI_ID for indexing a POI database, as described in reference to FIG. 5.

FIG. 5 is an example data structure for storing POI data. In the example shown, a database table can be used to store POI data in a POI database. Each row of the table can correspond to an individual POI_ID. The first column can include a unique POI ID, the second and third columns can include latitude and longitude of the location of the POA, the fourth column can include L1 data, such as the cryptic transaction description and the fifth column can include L2 supplemental data, such as business name and street address. Other implementations can include more or fewer columns or rows in the table. For example, other data can be included in the POI data, which can be aggregated from many different data sources, including but not limited to: a telephone number, a web address, content (e.g., digital photos, videos), e-mail address, customer ratings of the business, etc.

In the example shown, the L1 cryptic transaction description ACM #2358 maps to POI_ID 33421 (row 1 of table), which includes the full and correct name of the business Acme Inc. and its street address, 123 Main St, Redwood City, Calif. 94064, which was provided by an L2 data vector, as described in reference to FIG. 3.

FIG. 6 is an example histogram illustrating the use of georeferenced transaction data (L1 transaction timestamps) to determine business hours of POIs. In the example shown, the y-axis is the number of transaction occurrences and the x-axis is time. In the example shown, the highest number of transactions occurred between the hours of 9:00 AM and 10:00 PM. From this data it can be inferred that the business hours for the business associated with the transactions is open from 9:00 AM to 10:00 PM. This functionality can be extended to include day of the week or other time range using a different histogram. In some implementations, the functionality can be extended to seasonality, such as indicating that a business is open only for winter or summer.

Example Client Architecture

Figure 7:
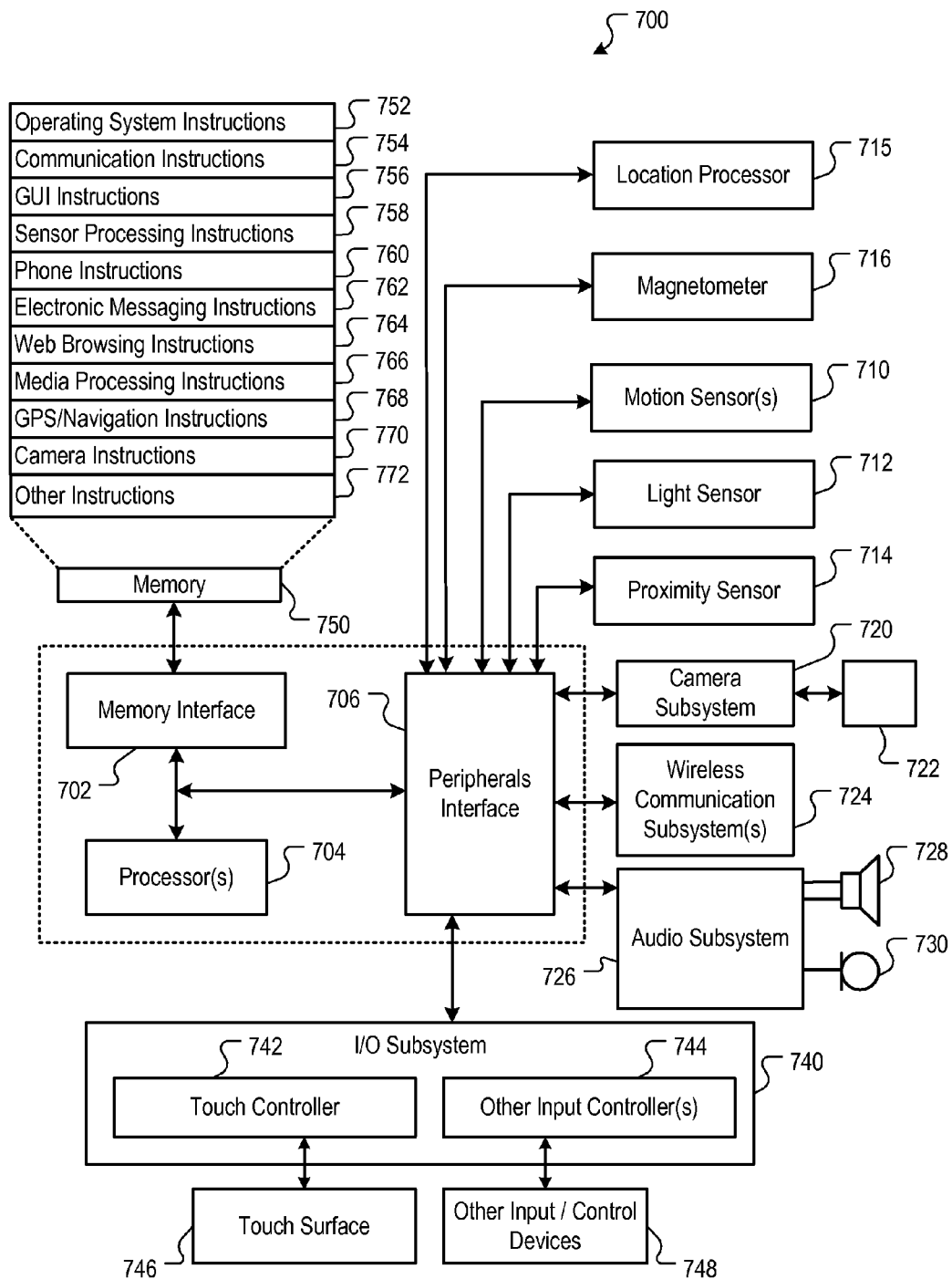
FIG. 7 is a block diagram of example client device architecture for implementing the features and processes described in reference to FIGS. 1-6.

FIG. 7 is a block diagram of example architecture for the client devices 104 described in reference to FIGS. 1-6. Architecture 700 may be implemented in any mobile device for generating the features described in reference to FIGS. 1-6, including but not limited to portable computers, smart phones and tablet computers, game consoles, wearable computers and the like. Architecture 700 may include memory interface 702, data processor(s), image processor(s) or central processing unit(s) 704, and peripherals interface 706. Memory interface 702, processor(s) 704 or peripherals interface 706 may be separate components or may be integrated in one or more integrated circuits. One or more communication buses or signal lines may couple the various components.

Sensors, devices, and subsystems may be coupled to peripherals interface 706 to facilitate multiple functionalities. For example, motion sensor 710, light sensor 712, and proximity sensor 714 may be coupled to peripherals interface 706 to facilitate orientation, lighting, and proximity functions of the device. For example, in some implementations, light sensor 712 may be utilized to facilitate adjusting the brightness of touch surface 746. In some implementations, motion sensor 710 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 706, such as a temperature sensor, a biometric sensor, or other sensing device, to facilitate related functionalities.

Location processor 715 (e.g., GPS receiver chip) may be connected to peripherals interface 706 to provide georeferencing. Electronic magnetometer 716 (e.g., an integrated circuit chip) may also be connected to peripherals interface 706 to provide data that may be used to determine the direction of magnetic North. Thus, electronic magnetometer 716 may be used with an electronic compass application.

Camera subsystem 720 and an optical sensor 722, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 724. Communication subsystem(s) 724 may include one or more wireless communication subsystems. Wireless communication subsystems 724 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 724 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 724 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 726 may be coupled to a speaker 728 and one or more microphones 730 to facilitate voice-enabled functions, such as voice recognition, voice replication, digital recording, and telephony functions.

I/O subsystem 740 may include touch controller 742 and/or other input controller(s) 744. Touch controller 742 may be coupled to a touch surface 746. Touch surface 746 and touch controller 742 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 746. In one implementation, touch surface 746 may display virtual or soft buttons and a virtual keyboard, which may be used as an input/output device by the user.

Other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of speaker 728 and/or microphone 730.

In some implementations, device 700 may present recorded audio and/or video files, such as MP3, AAC, and MPEG video files. In some implementations, device 700 may include the functionality of an MP3 player and may include a pin connector for tethering to other devices. Other input/output and control devices may be used.

Memory interface 702 may be coupled to memory 750. Memory 750 may include high-speed random access memory or non-volatile memory, such as one or more magnetic disk storage devices, one or more optical storage devices, or flash memory (e.g., NAND, NOR). Memory 750 may store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 may include a kernel (e.g., UNIX kernel).

Memory 750 may also store communication instructions 754 to facilitate communicating with one or more additional devices, one or more computers or servers, including peer-to-peer communications, as described in reference to FIGS. 1-6. Communication instructions 754 may also be used to select an operational mode or communication medium for use by the device, based on a geographic location (obtained by the GPS/Navigation instructions 768) of the device. Memory 750 may include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes; camera instructions 770 to facilitate camera-related processes and functions; and other instructions 772 for performing some or all of the processes, as described in reference to FIGS. 1-6.

Each of the above identified instructions and applications may correspond to a set of instructions for performing one or more functions described above. These instructions need not be implemented as separate software programs, procedures, or modules. Memory 750 may include additional instructions or fewer instructions. Furthermore, various functions of the device may be implemented in hardware and/or in software, including in one or more signal processing and/or application specific integrated circuits (ASICs).

Example Server Architecture

Figure 8:
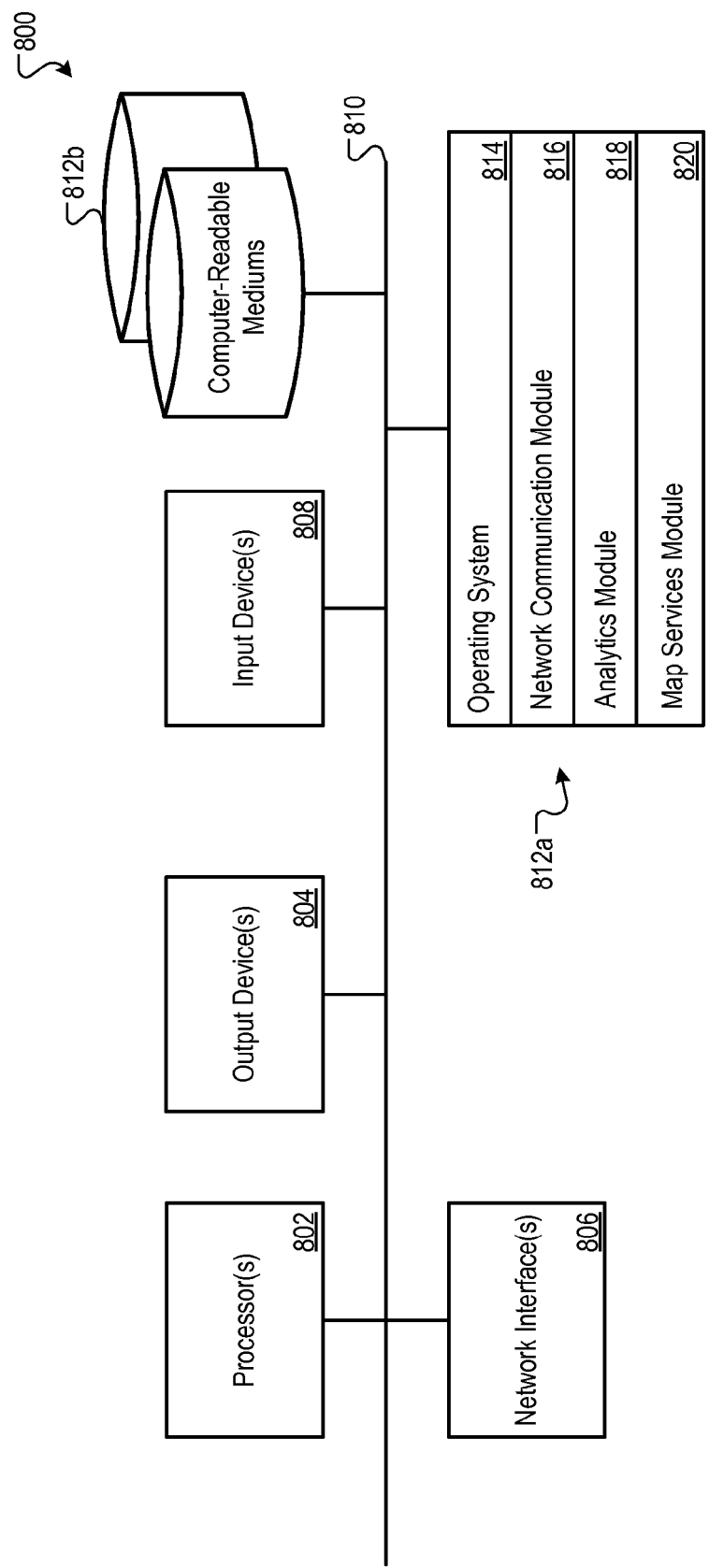
FIG. 8 is a block diagram of example server computer architecture for implementing the features and processes described in reference to FIGS. 1-6.

FIG. 8 is a block diagram of example architecture for a server computer operated by service 114 described when referring to FIGS. 1-6. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 and memory 813 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 812 or memory 813 can further include operating system 814 (e.g., Mac OS® server, Windows® NT server), network communication module 816, analytics module 818 and map services module 820. Operating system 814 can be multi-user, multiprocessing, multitasking, multithreading, real time, etc. Operating system 814 performs basic tasks, including but not limited to: recognizing input from and providing output to devices 808, 804; keeping track and managing files and directories on computer-readable mediums 812 and memory 813; controlling peripheral devices; and managing traffic on the one or more communication channels 810. Network communications module 816 includes various components for establishing and maintaining network connections (e.g., software for implementing communication protocols, such as TCP/IP, HTTP, etc.). Analytics module 818 performs statistical analysis on harvested transaction data, such as cluster analysis (e.g., k-means clustering). Map services module 820 performs various map services including associating supplemental data with clusters and updating POI database entries with the associated supplement data.

Architecture 800 can be included in any computer device, including one or more server computers each having one or more processing cores. Architecture 800 can be implemented in a parallel processing or peer-to-peer infrastructure or on a single device with one or more processors. Software can include multiple software components or can be a single body of code.

Figure 9:
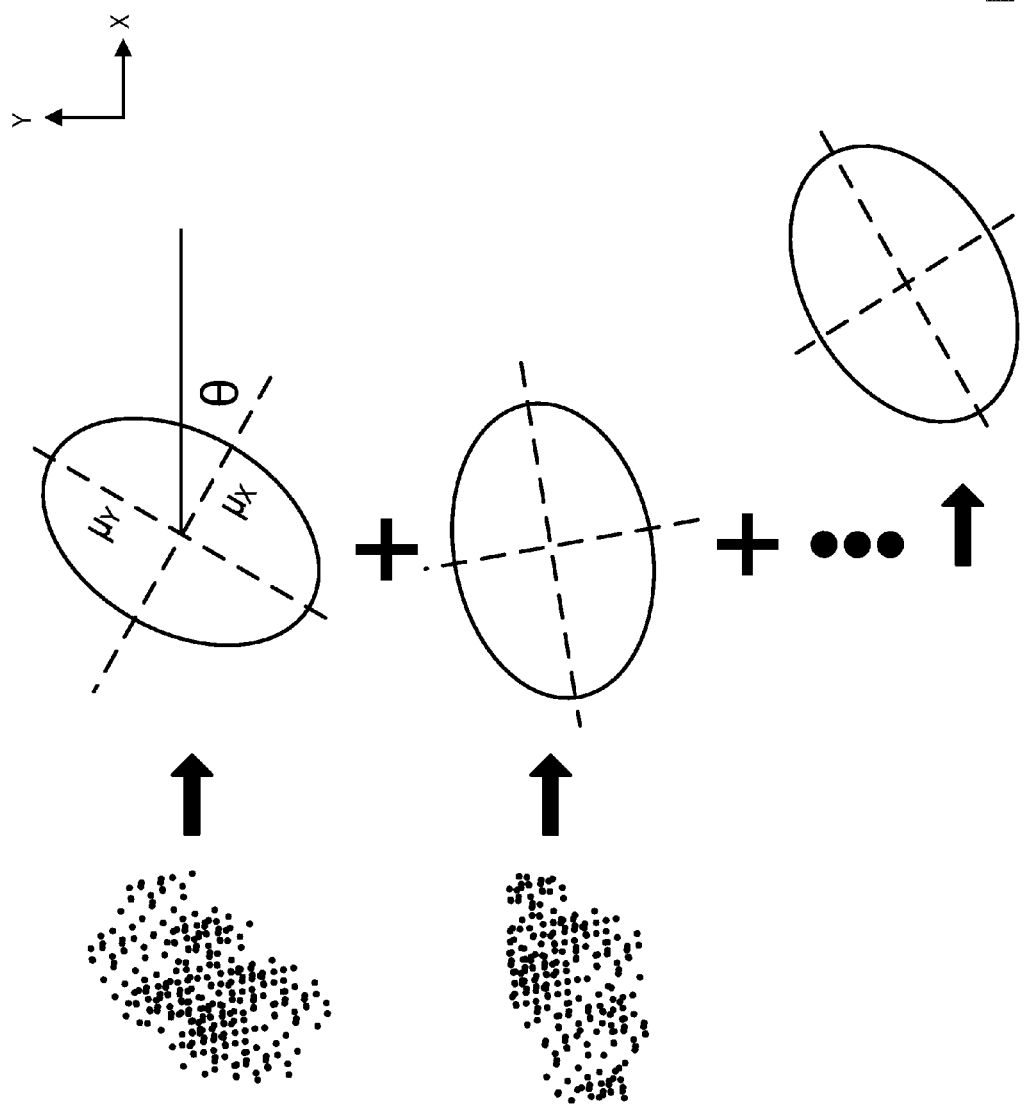
FIG. 9 illustrates an example process of describing a cluster of data with a limited set of parameters.

FIG. 9 illustrates an example process of describing a cluster of data with a limited set of parameters. In some implementations, due to privacy concerns georeferenced transaction data may only be stored for a limited period of time and then discarded. To ensure that the processes described herein can be performed after the data points are discarded, parameters describing clusters of georeferenced transaction data points are calculated and stored. The original georeferenced transaction data points cannot be recovered using the description parameters. The process described below can be applied to any clustered data and not just georeferenced transaction data.

A probability distribution of a cluster data points can be described by mean X, mean Y, and a covariance matrix for X and Y. This information allows an ellipse (abstraction representation of a cluster) to be fitted to the clustered data. Parameters of an ellipse can be derived that describe a maximally informative Cartesian plane rotated θ degrees from the original X and Y axes, and also describes standard deviations in both the horizontal and vertical directions of the rotated Cartesian plane.

As time passes disjoint clusters representing the same data entity will need to be added without losing the accuracy of the entire data history. In some implementations, a union is formed of multiple cluster descriptions (mean X, mean Y, covariance matrix) corresponding to a same region in space over disjoint time periods. Covariance matrices of disjoint clusters are stored rather than the raw data points. This makes the original data points non-recoverable (to comply with privacy requirements), while retaining the ability to combine the covariance matrices and derive an ellipse that is equivalent to the ellipse that would have been obtained if the raw data points from all clusters were stored and used. In some implementations, older clusters may contribute less to the export according to a decaying function to reflect trends in the current data.

To calculate a union between covariance matrices derived from two disjoint clusters representing the same data entity, the following six properties for each cluster are determined: count of points; sum of squared of x; sum of squared of y; sum of x*y; mean x and mean y. Given these properties a weighted union of two or more cluster descriptions can be obtained by producing a product equivalent to having the entire distribution of original data points, without recreating the data points involved in the calculation.

Given set [A] having $n_a$ data points, set [B] having $n_b$ data points and set [C] having $n_c$ data points, a covariance matrix $covM_c$ for set [C] that is the weighted union of set [A] and set [B] is given by equations [1]-[4]:

$$covM_c = \begin{bmatrix} varC^x & covarC^{xy} \\ covarC^{xy} & varC^y \end{bmatrix}, \quad [1]$$

$$varC^x = \frac{n_c}{(n_c-1)} * \left[ \frac{\sum_i^{n_a} x_{ai}^2 + \sum_j^{n_b} x_{bj}^2}{n_c} - \left( \frac{\sum_i^{n_a} x_{ai} + \sum_j^{n_b} x_{bj}}{n_c} \right)^2 \right], \quad [2]$$

$$varC^y = \frac{n_c}{(n_c-1)} * \left[ \frac{\sum_i^{n_a} y_{ai}^2 + \sum_j^{n_b} y_{bj}^2}{n_c} - \left( \frac{\sum_i^{n_a} y_{ai} + \sum_j^{n_b} y_{bj}}{n_c} \right)^2 \right], \quad [3]$$

$$covarC^{xy} = \frac{n_c}{(n_c-1)} * \left[ \frac{\sum_i^{n_a} xy_{ai} + \sum_j^{n_b} xy_{bj}}{n_c} - \frac{\left(\sum_i^{n_a} x_{ai} + \sum_j^{n_b} x_{bj}\right) * \left(\sum_i^{n_a} y_{ai} + \sum_j^{n_b} y_{bj}\right)}{n_c^2} \right]. \quad [4]$$

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, at a user device, one or more timestamps of one or more transaction events and a respective location of the user device at each timestamp;
   converting, by one or more hardware processors, the one or more timestamps into one or more time windows;
   submitting, by the user device to a network-based service, georeferenced transaction data, the georeferenced transaction data including the one or more converted timestamps and one or more locations of the user device corresponding to the one or more converted timestamps;
   receiving, from the network-based service, point of interest (POI) data, the POI data including information on an attribute of a POI in the georeferenced transaction data;
   updating, by the one or more hardware processors, the georeferenced transaction data in a database, including supplementing the georeferenced transaction data with the information on the attribute of the POI; and providing the supplemented georeferenced transaction data for display on the user device.

2. The method of claim 1, wherein the POI data is mapped to a location of the POI based on clustering of the one or more locations.

3. The method of claim 1, wherein the georeferenced transaction data includes a transaction description and geographic coordinates of the user device.

4. The method of claim 1, wherein the attribute of the POI includes business hours of the POI.

5. The method of claim 1, wherein the supplemented georeferenced transaction data is stored in a database table including a first column and a second column, the first column storing a transaction description, the second column storing a name of the POI and a street address of the POI.

6. The method of claim 1, wherein the georeferenced transaction data includes one or more transaction descriptions and are clustered based on a common transaction description.

7. The method of claim 1, wherein the information on the attribute of the POI includes at least one of a business name or street address.

8. The method of claim 1, wherein the transaction event is a Near Field Communication (NFC) transaction.

9. The method of claim 1, further comprising:
adding a new POI to a POI database.

10. The method of claim 1, further comprising:
correcting POI locations using address information included in supplemental data.

11. The method of claim 1, further comprising performing a cluster analysis on the georeferenced transaction data, wherein the cluster analysis results in two or more clusters associated with the georeferenced transaction data and the POI data is mapped to one of the two or more clusters.

12. A system comprising:
one or more processors;
memory coupled to the one or more processors and configured to store instructions, which, when executed by the one or more processors, causes the one or more processors to perform operations comprising:
determining, at a user device, one or more timestamps of one or more transaction events and a respective location of the user device at each timestamp;
converting the one or more timestamps into one or more time windows;
submitting, by the user device to a network-based service, georeferenced transaction data, the georeferenced transaction data including the one or more converted timestamps and one or more locations of the user device corresponding to the one or more converted timestamps;
receiving, from the network-based service, point of interest (POI) data, the POI data including information on an attribute of a POI in the georeferenced transaction data, the attribute being present for the POI during the one or more time windows;
updating the georeferenced transaction data in a database, including supplementing the georeferenced transaction data with the information on the attribute of the POI; and
providing the supplemented georeferenced transaction data for display on the user device.

13. The system of claim 12, wherein the POI data is mapped to a location of the POI based on clustering of the one or more locations.

14. The system of claim 12, wherein the georeferenced transaction data includes a transaction description and geographic coordinates of the user device.

15. The system of claim 14, wherein the attribute of the POI includes business hours of the POI.

16. The system of claim 15, wherein the supplemented georeferenced transaction data is stored in a database table including a first column and a second column, the first column storing the transaction description, the second column storing a name of the POI and a street address of the POI.

17. The system of claim 12, wherein the georeferenced transaction data includes one or more transaction descriptions and are clustered based on a common transaction description.

18. The system of claim 12, wherein the information on the attribute of the POI includes at least one of a business name or street address.

19. The system of claim 12, wherein the transaction event is a Near Field Communication (NFC) transaction.

20. The system of claim 12, further comprising:
adding a new POI to a POI database.

21. The system of claim 12, further comprising:
correcting POI locations using address information included in supplemental data.

22. The system of claim 12, further comprising performing a cluster analysis on the georeferenced transaction data, wherein the cluster analysis results in two or more clusters associated with the georeferenced transaction data and the POI data is mapped to one of the two or more clusters.

* * * * *